US008458898B2

(12) United States Patent
Wild

(10) Patent No.: US 8,458,898 B2
(45) Date of Patent: Jun. 11, 2013

(54) METHOD OF PREPARING A TERMINAL END OF A CORRUGATED COAXIAL CABLE FOR TERMINATION

(75) Inventor: Werner Karl Wild, Buttenwiesen (DE)

(73) Assignee: John Mezzalingua Associates, LLC, East Syracuse, NY (US)

( * ) Notice: Subject to any disclaimer, the term of this patent is extended or adjusted under 35 U.S.C. 154(b) by 0 days.

(21) Appl. No.: 13/178,408

(22) Filed: Jul. 7, 2011

(65) Prior Publication Data

US 2012/0102733 A1 May 3, 2012

Related U.S. Application Data

(60) Provisional application No. 61/407,803, filed on Oct. 28, 2010.

(51) Int. Cl.
*H01B 13/20* (2006.01)

(52) U.S. Cl.
USPC ............................ 29/828; 29/825; 174/102 R

(58) Field of Classification Search
USPC .................. 29/828, 825, 739; 174/24, 102 R; 439/583–584
See application file for complete search history.

(56) References Cited

U.S. PATENT DOCUMENTS 3,764,959 A 10/1973 Toma et al.
3,910,673 A 10/1975 Stokes
4,531,805 A 7/1985 Werth
4,579,415 A 4/1986 Van Brunt et al.
4,676,577 A 6/1987 Szegda
4,808,128 A 2/1989 Werth
4,952,174 A 8/1990 Sucht et al.
5,137,470 A 8/1992 Doles
5,167,533 A 12/1992 Rauwolf
5,199,894 A 4/1993 Kalny et al.
5,322,454 A 6/1994 Thommen (Continued)

FOREIGN PATENT DOCUMENTS

DE 4344328 C1 1/1995
EP 1858123 A2 11/2007

(Continued)

OTHER PUBLICATIONS

U.S. Appl. No. 13/178,483, filed Jul. 7, 2011; Confirmation No. 8511.

(Continued)

*Primary Examiner* — Minh Trinh
(74) *Attorney, Agent, or Firm* — Schmeiser, Olsen & Watts, LLP

(57) ABSTRACT

A method for preparing a terminal end of a cable to connect to a cable connector is provided. The method includes stripping a jacket, an insulating layer, and a corrugated outer conductor from a first section of a coaxial cable, stripping the jacket from a second section of the coaxial cable, and axially advancing a terminal end of the corrugated outer conductor beyond a terminal end of the insulating layer, resulting in an open section of the corrugated coaxial cable having an open space between the corrugated outer conductor and the inner conductor. A tool for accomplishing the foregoing is further provided, and includes first and second opposing jaws that engage the inner and outer conductors, respectively, such that operating the tool causes a terminal end of the outer conductor to axially advance toward the terminal end of the inner conductor.

3 Claims, 12 Drawing Sheets

400

Begin

Strip The Jacket, Insulating Layer, And Outer Conductor From A First Section Of The Coaxial Cable — 402

Strip The Jacket From A Second Section Of The Coaxial Cable — 404

Axially Stretch The Outer Conductor Toward The Terminal End Of The Inner Conductor — 406

Insert An Internal Connector Structure Between The Inner And Outer Conductors — 408

410 — Clamp An External Connector Structure Around The Outer Conductor

412 — Increase A Contact Force Between The Inner Conductor And The Conductive Pin End

U.S. PATENT DOCUMENTS 5,393,244 A 2/1995 Szegda
5,397,243 A 3/1995 MacMurdo, Sr.
5,435,745 A 7/1995 Booth
5,518,420 A 5/1996 Pitschi
5,620,339 A 4/1997 Gray et al.
5,720,630 A 2/1998 Richmond et al.
5,766,037 A 6/1998 Nelson
5,863,220 A 1/1999 Holliday
5,938,474 A 8/1999 Nelson
5,984,723 A * 11/1999 Wild ............................ 439/583
6,019,519 A 2/2000 Grinderslev et al.
6,019,636 A 2/2000 Langham
6,032,358 A 3/2000 Wild
6,102,738 A 8/2000 Macek et al.
6,109,964 A 8/2000 Kooiman
6,123,567 A 9/2000 McCarthy
6,133,532 A 10/2000 Lundback et al.
6,183,298 B1 2/2001 Henningsen et al.
6,203,360 B1 3/2001 Harting et al.
6,206,579 B1 3/2001 Selfridge et al.
6,264,374 B1 7/2001 Selfridge et al.
6,267,621 B1 7/2001 Pitschi et al.
6,272,738 B1 8/2001 Holliday et al.
6,309,251 B1 10/2001 Tang
6,331,123 B1 12/2001 Rodrigues
6,386,915 B1 5/2002 Nelson
6,471,545 B1 10/2002 Hosler, Sr.
6,478,618 B2 11/2002 Wong
6,494,743 B1 12/2002 Lamatsch et al.
6,569,565 B2 5/2003 Ligeois et al.
6,607,398 B2 8/2003 Henningsen
6,733,336 B1 5/2004 Montena et al.
6,840,803 B2 1/2005 Wlos et al.
6,878,049 B2 4/2005 Heidelberger et al.
6,884,113 B1 4/2005 Montena
6,884,115 B2 4/2005 Malloy
6,939,169 B2 9/2005 Islam et al.
6,955,562 B1 10/2005 Henningsen
6,976,872 B1 12/2005 Wild et al.
7,008,264 B2 3/2006 Wild
7,021,965 B1 4/2006 Montena
7,029,304 B2 4/2006 Montena
7,029,326 B2 4/2006 Montena
7,070,447 B1 7/2006 Montena
7,077,699 B2 7/2006 Islam et al.
7,086,897 B2 8/2006 Montena
7,104,839 B2 9/2006 Henningsen et al.
7,108,547 B2 9/2006 Kisling et al.
7,112,093 B1 9/2006 Holland
7,128,603 B2 10/2006 Burris et al.
7,131,868 B2 11/2006 Montena
7,156,560 B2 1/2007 Seeley
7,156,696 B1 1/2007 Montena
7,163,420 B2 1/2007 Montena
7,189,115 B1 3/2007 Montena
7,207,838 B2 4/2007 Andreescu
7,264,502 B2 9/2007 Holland
7,278,854 B1 10/2007 Robinette et al.
7,303,435 B2 12/2007 Burris et al.
7,309,255 B2 12/2007 Rodrigues
7,335,059 B2 2/2008 Vaccaro
7,347,729 B2 3/2008 Thomas et al.
7,351,101 B1 4/2008 Montena
7,357,672 B2 4/2008 Montena
7,458,851 B2 12/2008 Montena
7,497,729 B1 3/2009 Wei
7,513,722 B2 4/2009 Greenberg et al.
7,566,243 B1 7/2009 Hung
7,588,460 B2 9/2009 Malloy et al.
7,632,143 B1 12/2009 Islam
7,637,774 B1 12/2009 Vaccaro
7,806,724 B2 10/2010 Paynter et al.
7,824,215 B2 11/2010 Islam et al.
7,857,661 B1 12/2010 Islam
7,918,687 B2 4/2011 Paynter et al.
7,927,134 B2 4/2011 Paynter et al.
7,993,159 B2 8/2011 Chawgo
8,007,314 B2 8/2011 Chawgo et al.
8,038,472 B2 10/2011 Montena et al.
8,047,870 B2 11/2011 Clausen
8,123,557 B2 2/2012 Montena et al.
8,136,236 B2 * 3/2012 Amato ............................ 29/828
8,177,583 B2 5/2012 Chawgo et al.
2005/0079761 A1 4/2005 Rodrigues
2006/0014427 A1 1/2006 Islam et al.
2006/0134979 A1 6/2006 Henningsen
2006/0199431 A1 9/2006 Paynter
2006/0246774 A1 11/2006 Buck
2007/0149047 A1 6/2007 Wild et al.
2007/0270032 A1 11/2007 Eriksen
2008/0003873 A1 1/2008 Henningsen
2008/0254678 A1 10/2008 Amidon
2008/0274643 A1 11/2008 Chawgo
2009/0197465 A1 8/2009 Montena et al.
2009/0233482 A1 9/2009 Chawgo et al.
2009/0269979 A1 10/2009 Montena
2010/0261381 A1 10/2010 Montena et al.
2010/0261382 A1 10/2010 Montena et al.
2010/0273340 A1 10/2010 Clausen
2011/0008998 A1 1/2011 Low et al.
2011/0009000 A1 1/2011 Paynter
2011/0021074 A1 1/2011 Paynter et al.
2011/0263154 A1 10/2011 Chawgo et al.
2012/0088405 A1 4/2012 Wild et al.

FOREIGN PATENT DOCUMENTS

EP 2190068 A1 5/2010
EP 2219267 B1 1/2011
KR 200351496 Y1 5/2004
WO 2005004490 A1 1/2005

OTHER PUBLICATIONS

U.S. Appl. No. 13/178,397, filed Jul. 7, 2011; Confirmation No. 8327.
U.S. Appl. No. 13/178,443, filed Jul. 7, 2011; Confirmation No. 8409.
U.S. Appl. No. 12/421,826, filed Apr. 10, 2009; Confirmation No. 5251.
U.S. Appl. No. 13/174,697, filed Jun. 30, 2011; Confirmation No. 1265.
U.S. Appl. No. 13/178,492, filed Jul. 8, 2011; Confirmation No. 8535.
U.S. Appl. No. 13/077,582, filed Mar. 31, 2011; Confirmation No. 5822.
U.S. Appl. No. 13/178,490, filed Jul. 8, 2011; Confirmation No. 8531.
U.S. Appl. No. 13/228,441, filed Sep. 8, 2011; Confirmation No. 7498.
U.S. Appl. No. 13/228,445, filed Sep. 8, 2011; Confirmation No. 7510.
U.S. Appl. No. 13/178,408, filed Jul. 7, 2011; Confirmation No. 8362.
U.S. Appl. No. 13/178,488, filed Jul. 7, 2011; Confirmation No. 8527.
U.S. Appl. No. 61/505,535, filed Jul. 8, 2011; Confirmation No. 8532.
PCT/US2011/057810. International Search Report and Written Opinion. Date of Mailing: Apr. 30, 2012. 9 pages.
Notice of Allowance (Mail Date Apr. 1, 2011) for U.S. Appl. No. 11/743,633, filed May 2, 2007; Confirmation No. 7249.
Notice of Allowance (Mail Date Apr. 25, 2011) for U.S. Appl. No. 12/469,313, filed May 20, 2009; Confirmation No. 1663.
Notice of Allowance (Mail Date Jun. 13, 2011) for U.S. Appl. No. 12/421,894, filed Apr. 10, 2009; Confirmation No. 5395.
Office Action (Mail Date Mar. 23, 2011) for U.S. Appl. No. 12/421,855, filed Apr. 20, 2009; Confirmation No. 5331.
Application No. PCT/US2010/029725, International Search Report and the Written Opinion of the International Searching Authority, or the Declaration dated Nov. 16, 2010. 8 pages.

* cited by examiner

METHOD OF PREPARING A TERMINAL END OF A CORRUGATED COAXIAL CABLE FOR TERMINATION

CROSS REFERENCE TO RELATED APPLICATION[S]

This application claims priority to U.S. Provisional Patent Application to Werner Karl Wild entitled "CORRUGATED COAXIAL CABLE PREPARATION," Ser. No. 61/407,803, filed Oct. 28, 2010, the disclosure of which is hereby incorporated entirely herein by reference.

BACKGROUND

1. Technical Field

This disclosure relates generally to the field of coaxial cable connectors and more particularly to a method of preparing a cable end for coupling to a connector.

2. State of the Art

Corrugated coaxial cable is used to transmit radio frequency (RF) signals in various applications, such as connecting radio transmitters and receivers with their antennas. Corrugated coaxial cable typically includes an inner conductor, an insulating layer surrounding the inner conductor, a corrugated outer conductor surrounding the insulating layer, and a protective jacket surrounding the corrugated outer conductor.

A corrugated coaxial cable is typically terminated on either end with a connector. In order to terminate a terminal end of a corrugated coaxial cable with a connector, the terminal end typically requires specific preparation. For example, the attachment of some field-installable compression connectors requires the removal of a section of the insulating layer at the terminal end of the corrugated coaxial cable in order to insert a support structure of the compression connector between the inner conductor and the outer conductor. The support structure of the compression connector prevents the collapse of the outer conductor when the compression connector applies pressure to the outside of the outer conductor.

The removal of the section of the insulating layer is typically accomplished using a rotating coring tool having one or more rotating blades. Unfortunately, however, the coring out of the section of the insulating layer using the blade(s) of a rotating coring tool can result in the damage to the inner and/or outer conductors. For example, the blade(s) of the rotating coring tool can inadvertently knick inner and/or outer conductors, which can result in poor impedance matching and/or poor passive intermodulation performance. In addition, slivers of conductive metal that are inadvertently carved from the inner and/or outer conductors by the blade(s) of the rotating coring tool can become imbedded in the insulating layer, which can further degrade impedance matching and passive intermodulation.

SUMMARY

The present disclosure relates to the field of transmission cable connectors and more particularly to a method of preparing a cable end to connect to a cable connector and to a tool used to prepare the cable end for connection.

An aspect of the present disclosure includes a method for preparing a terminal end of a corrugated coaxial cable for termination, the corrugated coaxial cable comprising an inner conductor, an insulating layer surrounding the inner conductor, a corrugated outer conductor surrounding the insulating layer, and a jacket surrounding the corrugated outer conductor, the method comprising stripping the jacket, insulating layer, and corrugated outer conductor from a first section of the coaxial cable, stripping the jacket from a second section of the coaxial cable, and axially stretching a terminal end of the corrugated outer conductor beyond a terminal end of the insulating layer, resulting in an open section of the corrugated coaxial cable having an open space between the corrugated outer conductor and the inner conductor.

Another aspect of the present disclosure includes the corrugated outer conductor having alternating peaks and valleys, wherein two successive peaks define an initial distance therebetween, and wherein two successive valleys define an initial distance therebetween. Axially stretching the terminal end of the corrugated outer conductor includes increasing the initial distance between two or more peaks or increasing the initial distance between two or more valleys, or both.

Another aspect of the disclosure includes grasping an outside surface of the corrugated outer conductor and pulling the terminal end of the corrugated outer conductor beyond the terminal end of the insulating layer, resulting in the open section of the coaxial cable having the open space between the corrugated outer conductor and the inner conductor.

Another aspect of the disclosure includes grasping an outside surface of the corrugated outer conductor and pulling the terminal end of the corrugated outer conductor beyond the terminal end of the insulating layer, resulting in an open section of the corrugated coaxial cable in which the corrugated outer conductor does not surround the insulating layer.

Another aspect of the disclosure includes a tool configured for use in preparing the corrugated coaxial cable for termination, the corrugated coaxial cable comprising an inner conductor, an insulating layer surrounding the inner conductor, a helical corrugated outer conductor surrounding the insulating layer, and a jacket surrounding the helical corrugated outer conductor, the tool having a first arm connected to a first jaw, and a second arm connected to a second jaw, wherein the first arm is hinged to the second arm such that as the arms are rotated away from each other the jaws are rotated away from each other and as the arms are rotated toward each other the jaws are rotated toward each other, and wherein the first jaw defines a cavity that is configured to receive a terminal end of the inner conductor, and the second jaw defines a threaded opening and that is configured to releasably couple to a terminal end of the helical corrugated outer conductor such that as the first and second arms are rotated toward each other the first and second jaws cooperate to axially advance the terminal end of the helical corrugated outer conductor beyond a terminal end of the insulating layer, resulting in an open section of the corrugated coaxial cable in which the corrugated outer conductor does not surround the insulating layer.

Another aspect of the disclosure includes the cavity in the first jaw being configured to engage the terminal end of the inner conductor to retain the inner conductor in place with respect to the outer conductor, and the threaded opening of the second jaw being configured to thread onto and engage an outer surface of the outer conductor, wherein, under the condition that the first and second arms are rotated toward each other, the terminal end of the outer conductor is axially stretched toward the terminal end of the inner conductor resulting in the open section of the corrugated coaxial cable in which at least the terminal end of the corrugated outer conductor does not surround the insulating layer.

Another aspect of the disclosure includes a stop attached to at least one of the first or second jaws that limits the distance that the terminal end of the corrugated outer conductor can be axially stretched by the tool. The stop may be adjustable.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Moreover, it is to be understood that both the foregoing general description and the following detailed description of the present disclosure are exemplary and explanatory and are intended to provide further explanation of the disclosure as claimed.

BRIEF DESCRIPTION OF THE DRAWINGS

Aspects of example embodiments of the present disclosure will become apparent from the following detailed description of example embodiments given in conjunction with the accompanying drawings, in which.

DETAILED DESCRIPTION OF SOME EXAMPLE EMBODIMENTS

In the following detailed description of some example embodiments, reference will now be made in detail to example embodiments of the present invention which are illustrated in the accompanying drawings. Wherever possible, the same reference numbers will be used throughout the drawings to refer to the same or like parts. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Example embodiments of the present invention relate to a method of corrugated coaxial cable preparation and a tool for accomplishing the same. The example embodiments disclosed herein improve impedance matching and passive intermodulation performance in corrugated coaxial cable terminations, thus reducing internal reflections and resulting signal loss associated with inconsistent impedance and interfering RF signals associated with poor passive intermodulation performance.

I. Example Corrugated Coaxial Cable and Example Connector

Figure 1A:
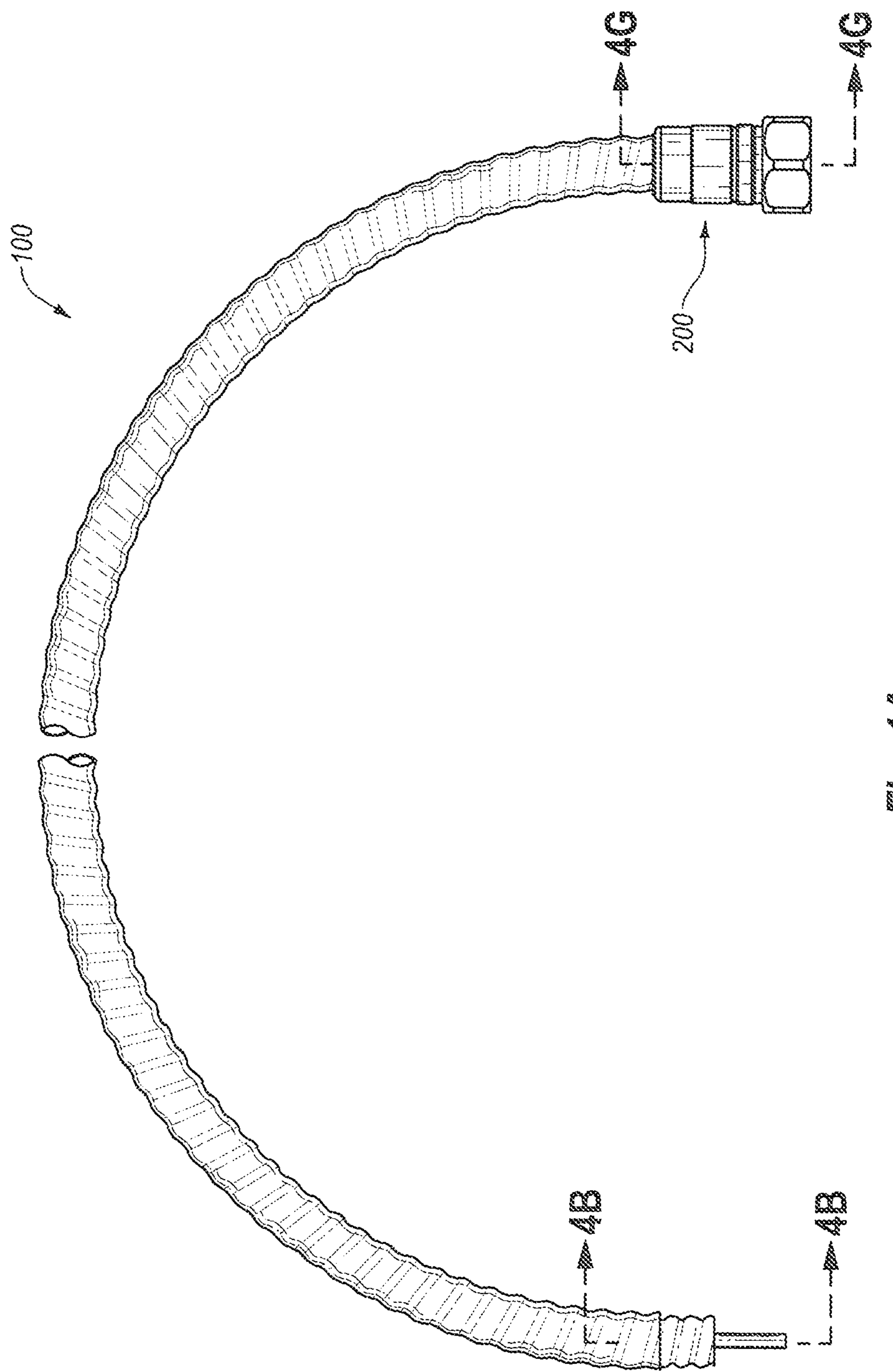
FIG. 1A is a perspective view of an example corrugated coaxial cable terminated on one end with an example compression connector.

With reference now to FIG. 1A, a first example corrugated coaxial cable 100 is disclosed. The example cable 100 has 50 Ohms of impedance and is a ½" series corrugated coaxial cable. It is understood, however, that these cable characteristics are example characteristics only, and that the example termination method and tool disclosed herein can also benefit corrugated coaxial cables with other impedance, dimension, and shape characteristics.

Also disclosed in FIG. 1A, the example cable 100 is terminated on the right side of FIG. 1A with an example field-installable compression connector 200. Although the example connector 200 is disclosed in FIG. 1A as a male connector, it is understood that the connector 200 can instead be configured as a female connector (not shown).

Figure 1B:
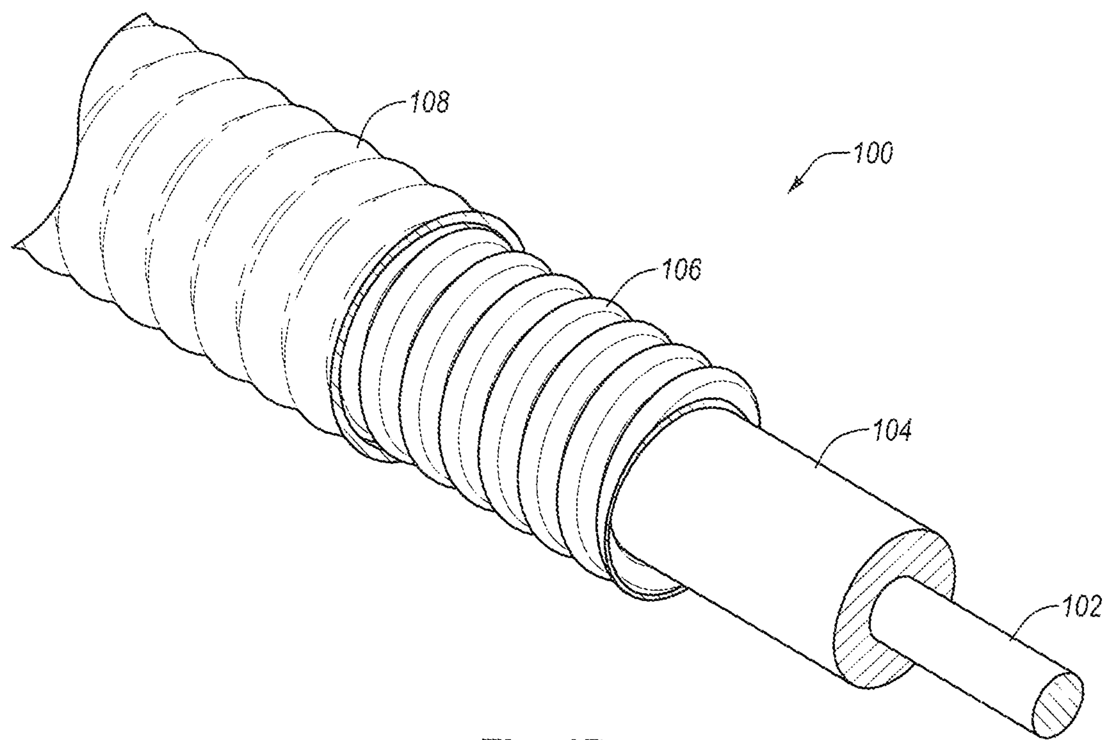
FIG. 1B is a perspective view of a portion of the example corrugated coaxial cable of FIG. 1A, the perspective view having portions of each layer of the example corrugated coaxial cable cut away.

With reference now to FIG. 1B, the example cable 100 generally includes an inner conductor 102 surrounded by an insulating layer 104, a corrugated outer conductor 106 surrounding the insulating layer 104, and a jacket 108 surrounding the corrugated outer conductor 106. As used herein, the phrase "surrounded by" refers to an inner layer generally being encased by an outer layer. However, it is understood that an inner layer may be "surrounded by" an outer layer without the inner layer being adjacent to the outer layer. The term "surrounded by" thus allows for the possibility of intervening layers. Each of these components of the example cable 100 will now be discussed in turn.

The inner conductor 102 is positioned at the core of the example cable 100 and may be configured to carry a range of electrical current (amperes) and/or RF/electronic digital signals. The inner conductor 102 can be formed from copper or copper-clad aluminum (CCA), although other conductive materials are also possible. For example, the inner conductor 102 can be formed from any type of conductive metal or alloy. In addition, although the inner conductor 102 of FIG. 1B is clad, it could instead have other configurations such as solid, stranded, corrugated, plated, or hollow, for example.

The insulating layer 104 surrounds the inner conductor 102, and generally serves to support the inner conductor 102 and insulate the inner conductor 102 from the corrugated outer conductor 106. Although not shown in the Figures, a precoat bonding agent, such as a polymer, may be employed to bond the insulating layer 104 to the inner conductor 102. As disclosed in FIG. 1B, the insulating layer 104 is formed from a foamed material such as, but not limited to, a foamed polymer or fluoropolymer. For example, the insulating layer 104 can be formed from foamed polyethylene (PE).

The corrugated outer conductor 106 surrounds the insulating layer 104, and generally serves to minimize the ingress and egress of high frequency electromagnetic radiation to/from the inner conductor 102. In some applications, high frequency electromagnetic radiation is radiation with a frequency that is greater than or equal to about 50 MHz. The corrugated outer conductor 106 can be formed from solid copper, solid aluminum, or copper-clad aluminum (CCA), although other conductive materials are also possible. The corrugated configuration of the corrugated outer conductor 106, with peaks and valleys, enables the coaxial cable 100 to be flexed more easily than cables with smooth-walled outer conductors. In addition, it is understood that the corrugated outer conductor 106 can be either a helical corrugated outer conductor, as disclosed in the Figures, or can be an annular corrugated outer conductor (not shown). Further, the example termination method and example tool disclosed herein can similarly benefit a coaxial cable with an annular corrugated outer conductor (not shown).

The jacket 108 surrounds the corrugated outer conductor 106, and generally serves to protect the internal components of the coaxial cable 100 from external contaminants, such as dust, moisture, and oils, for example. In a typical embodiment, the jacket 108 also functions to limit the bending radius of the cable to prevent kinking, and functions to protect the cable (and its internal components) from being crushed or otherwise misshapen from an external force. The jacket 108 can be formed from a variety of materials including, but not limited to, polyethylene (PE), high-density polyethylene (HDPE), low-density polyethylene (LDPE), linear low-density polyethylene (LLDPE), rubberized polyvinyl chloride (PVC), or some combination thereof. The actual material used in the formation of the jacket 108 might be indicated by the particular application/environment contemplated.

II. Example Coaxial Cable Preparation Tool

Figure 2A:
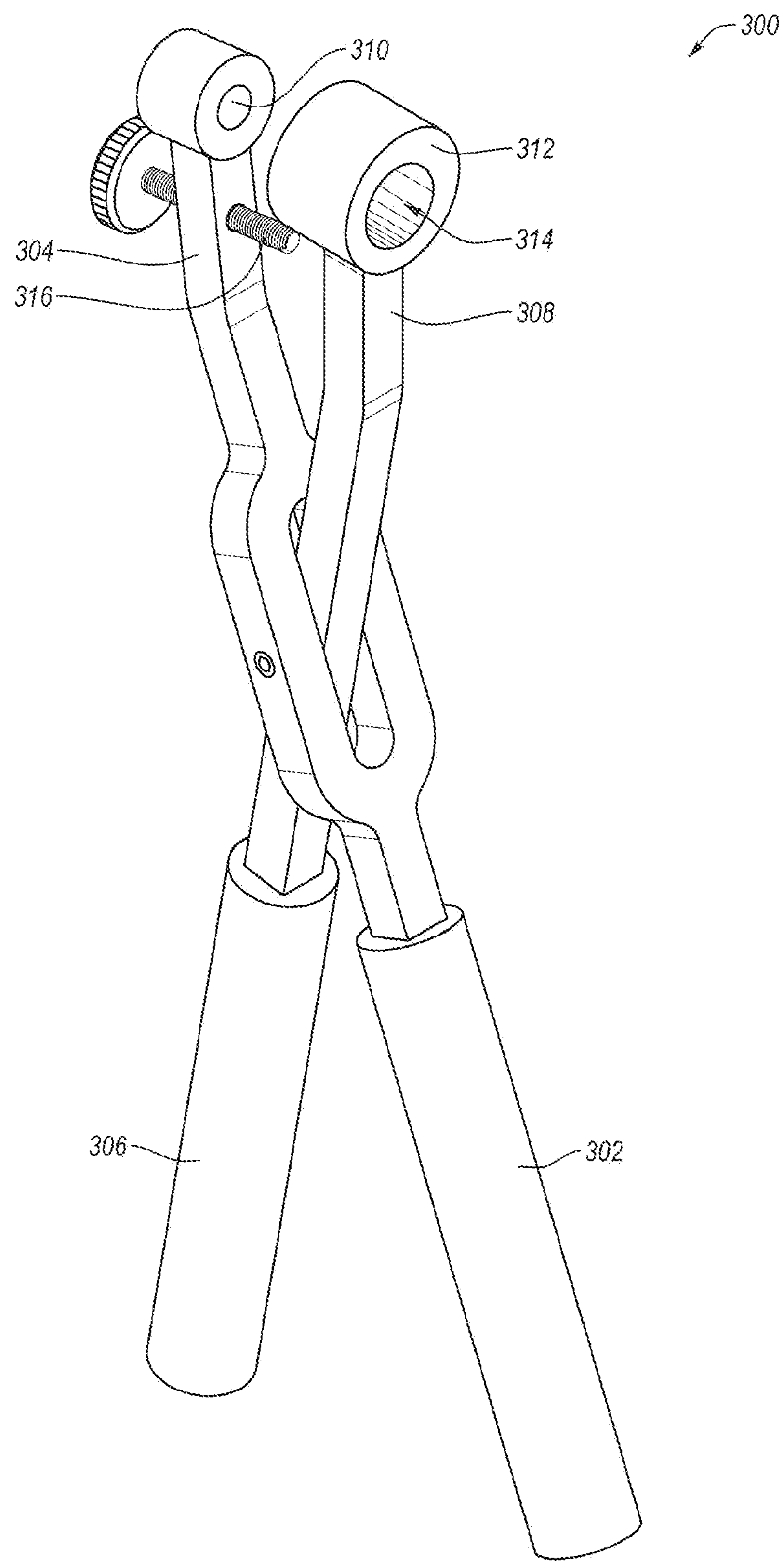
FIG. 2A is a perspective view of an example corrugated coaxial cable preparation tool.
Figure 2B:
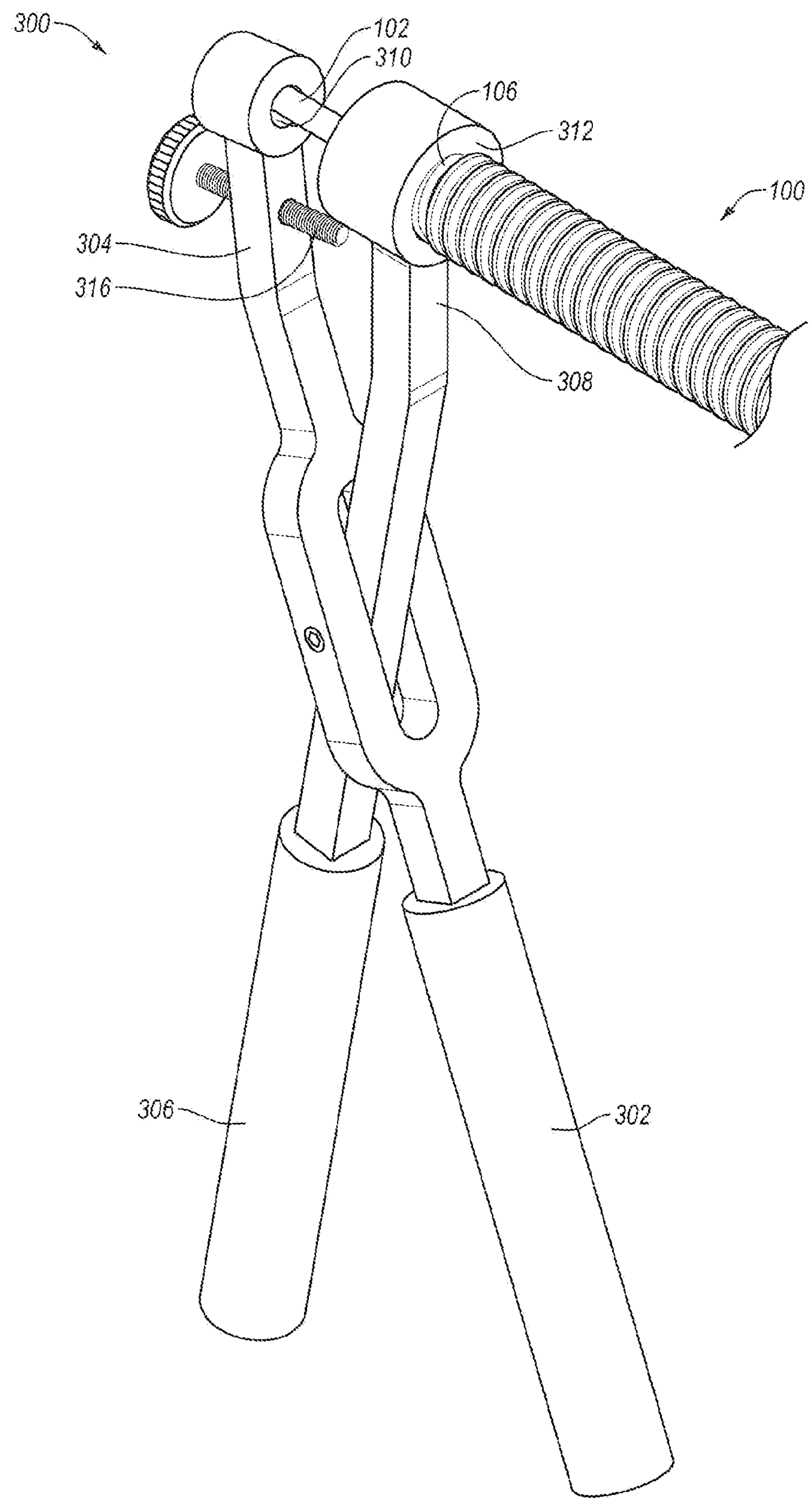
FIG. 2B is a perspective view of the example tool of FIG. 2A engaged with the example corrugated coaxial cable of FIG. 2A before the stretching of the corrugated outer conductor of the example corrugated coaxial cable by the example tool.
Figure 2C:
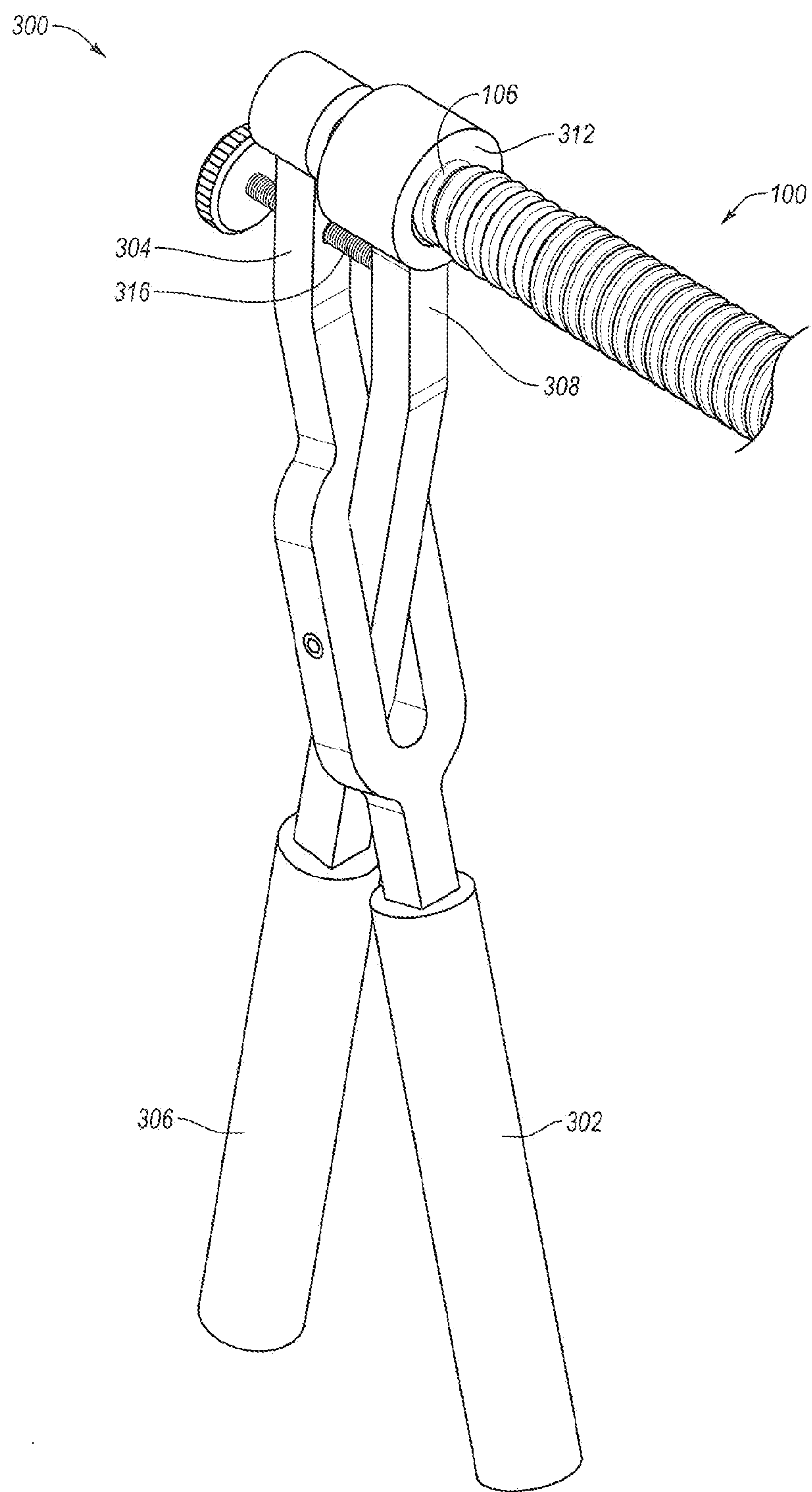
FIG. 2C is a perspective view of the example tool of FIG. 2A engaged with the example corrugated coaxial cable of FIG. 2A after the stretching of the corrugated outer conductor of the example corrugated coaxial cable by the example tool.

With reference now to FIGS. 2A-2C, an example corrugated coaxial cable preparation tool 300 is disclosed. The example tool 300 is configured for use in preparing the example corrugated coaxial cable 100 of FIGS. 1A and 1B for termination, and may be employed in the example method 400 discussed below. As disclosed in FIG. 2A, the example tool 300 includes a first arm 302 connected to a first jaw 304 and a second arm 306 connected to a second jaw 308. The first arm 302 is hinged to the second arm 306 such that as the arms 302 and 306 are rotated away from each other, the jaws 304 and 308 are rotated away from each other. Further, as the arms 302 and 306 are rotated toward each other, the jaws 304 and 308 are rotated toward each other.

As disclosed in FIG. 2A, the first jaw 304 defines a cavity 310 that is configured to receive a terminal end of the inner conductor 102, as disclosed in FIG. 2B. The second jaw 308 includes a nut 312 that defines a threaded opening 314. The threaded opening 314 is configured to screw onto and engage a terminal end of the helical corrugated outer conductor 106, as disclosed in FIGS. 2B and 2C. Although not disclosed in the drawings, it is understood that the nut 312 may be swivelable instead of being fixed, thus allowing the threaded opening 314 to engage a terminal end of the helical corrugated outer conductor 106 without rotating the entire tool 300.

As disclosed in FIG. 2A, the example coaxial cable preparation tool 300 may also include a stop 316 attached to the first arm 302. The stop 316 is adjustable, but it is understood that the stop 316 may instead be fixed. It is further understood that the stop 316 may be attached instead to the second arm 306.

III. Example Method for Terminating a Coaxial Cable

Figure 3:
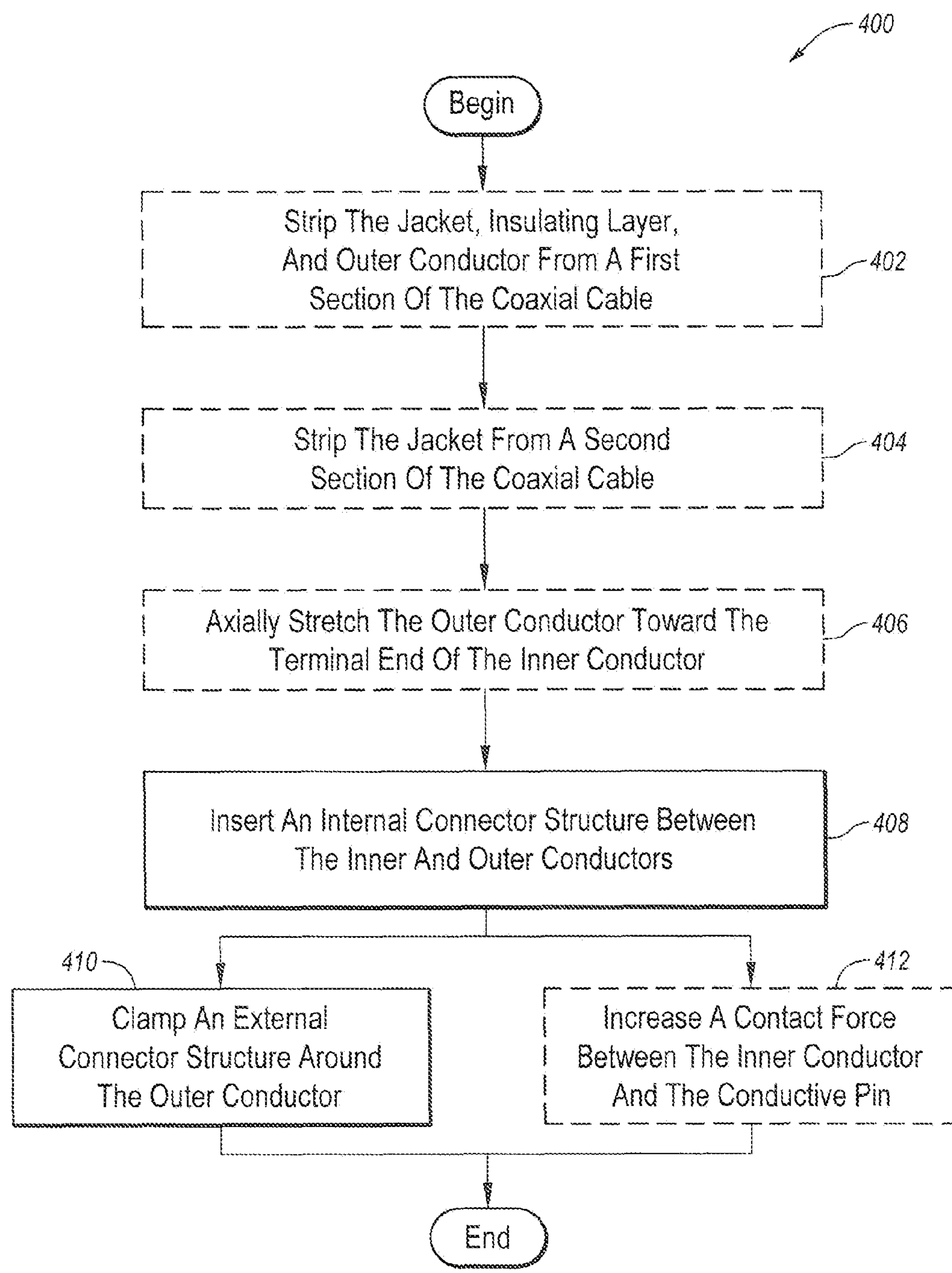
FIG. 3 is a flowchart of an example method for terminating the corrugated coaxial cable of FIGS. 1A and 1B.

With reference to FIG. 3, an example method 400 for terminating a coaxial cable is disclosed. For example, the example method 400 can be employed to terminate the example helical corrugated coaxial cable 100 of FIGS. 1A and 1B or a similar annular corrugated coaxial cable (not shown). The example method 400 enables a corrugated coaxial cable to be terminated with a field-installable compression connector having an insertable support structure, such as the support structure 202 of the example connector 200 (see FIGS. 4F and 4G), without risking the damage that can be caused by a rotating coring tool. Avoiding this damage can improve impedance matching and passive intermodulation performance in corrugated coaxial cable terminations, thus reducing internal reflections and resulting signal loss associated with inconsistent impedance and interfering RF signals associated with poor passive intermodulation performance.

Figure 4A:
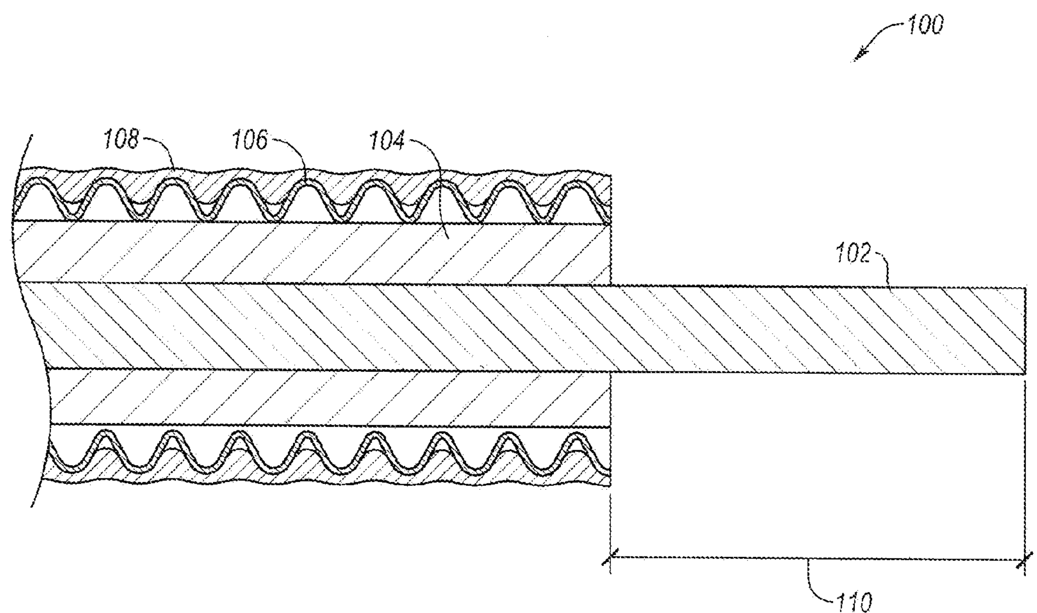
FIGS. 4A-4G are various cross-sectional side views of a terminal end of the example corrugated coaxial cable of FIGS. 1A and 1B and the example tool of FIG. 2A during various stages of the example method of FIG. 3.

With reference to FIGS. 3 and 4A-4G, an example embodiment of the method 400 in terminating the example corrugated coaxial cable 100 will now be disclosed. With reference to FIGS. 3 and 4A, the method 400 begins with an act 402 in which the jacket 108, corrugated outer conductor 106, and insulating layer 104 are stripped from a first section 110 of the coaxial cable 100 so as to expose a first section 110 of the inner conductor 102. This stripping of the jacket 108, corrugated outer conductor 106, and insulating layer 104 can be accomplished using a stripping tool (not shown) that is configured to automatically expose the section 110 of the inner conductor 102 of the example cable 100. The length of the section 110 corresponds to the length of exposed inner conductor 102 required by the connector 200 (see FIGS. 4F and 4G) and the method 400, although it is understood that other lengths are contemplated to correspond to the requirements of other connectors. Alternatively, the act 402 may be omitted altogether where the jacket 108, corrugated outer conductor 106, and insulating layer 104 have been pre-stripped from the section 110 of the coaxial cable 100 prior to the performance of the example method 400.

Figure 4B:
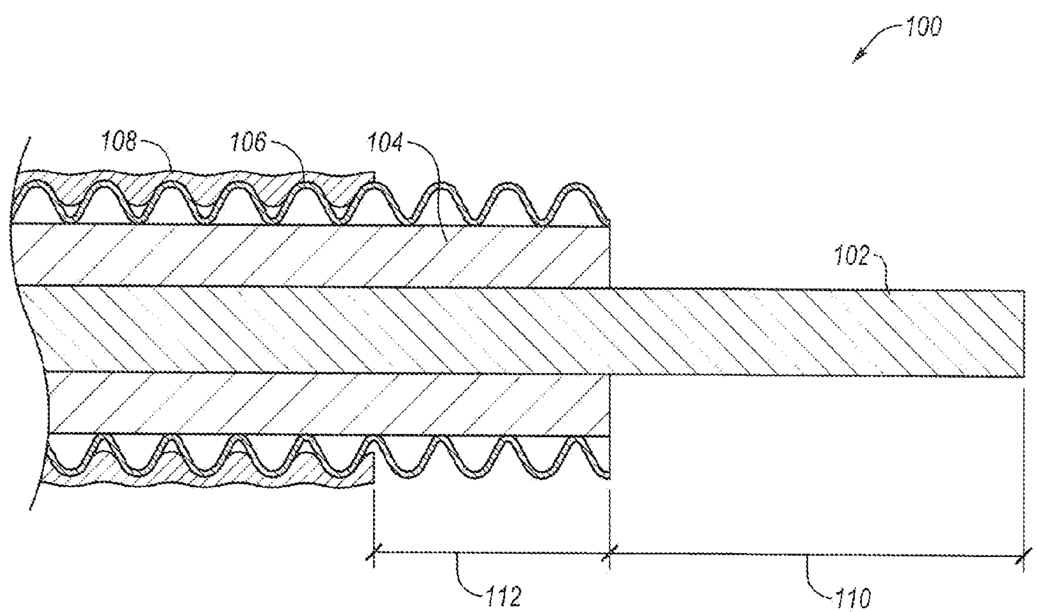

With reference to FIGS. 3 and 4B, the method 400 continues with an act 404 in which the jacket 108 is stripped from a second section 112 of the cable 100. This stripping of the jacket 108 can be accomplished using a stripping tool (not shown) that is configured to automatically expose the section 112 of the corrugated outer conductor 106 of the example cable 100. The length of the section 112 corresponds to the length of exposed corrugated outer conductor 106 required by the connector 200 (see FIGS. 4F and 4G) and the method 400, although it is understood that other lengths are contemplated to correspond to the requirements of other connectors. Alternatively, the act 404 may be omitted altogether where the jacket 108 has been pre-stripped from the section 112 of the coaxial cable 100 prior to the performance of the example method 400.

With reference to FIGS. 3 and 4C-4E, the method 400 continues with an act 406 in which a terminal end of the corrugated outer conductor 106 is axially stretched beyond a terminal end of the insulating layer 104 and toward a terminal end of the inner conductor 102, resulting in an open section 114 of the corrugated coaxial cable 100 having an open space between the corrugated outer conductor 106 and the inner conductor 102. This stretching of the corrugated outer conductor 106 can be accomplished using the example tool 300.

Figure 4C:
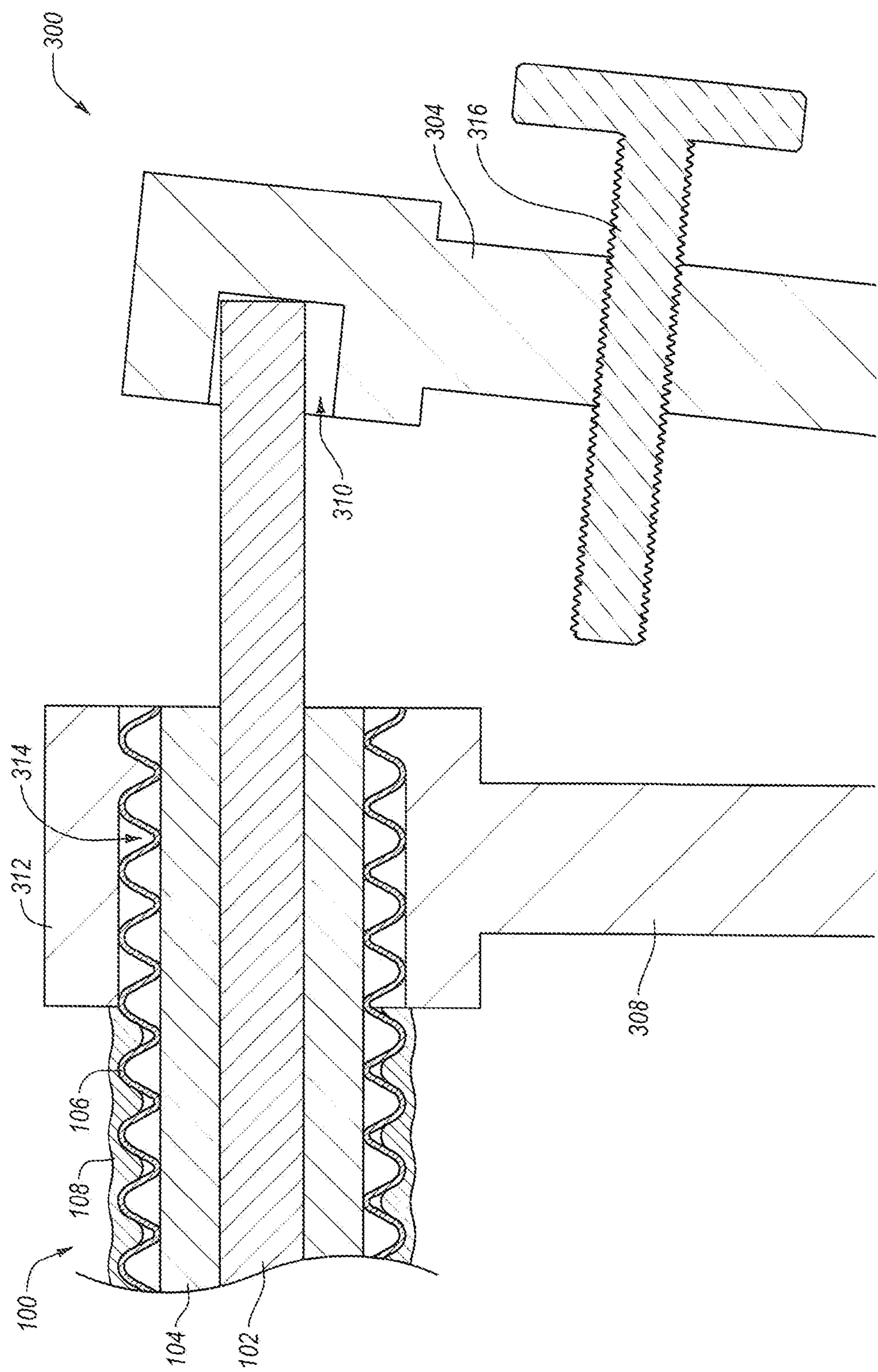
Figure 4D:
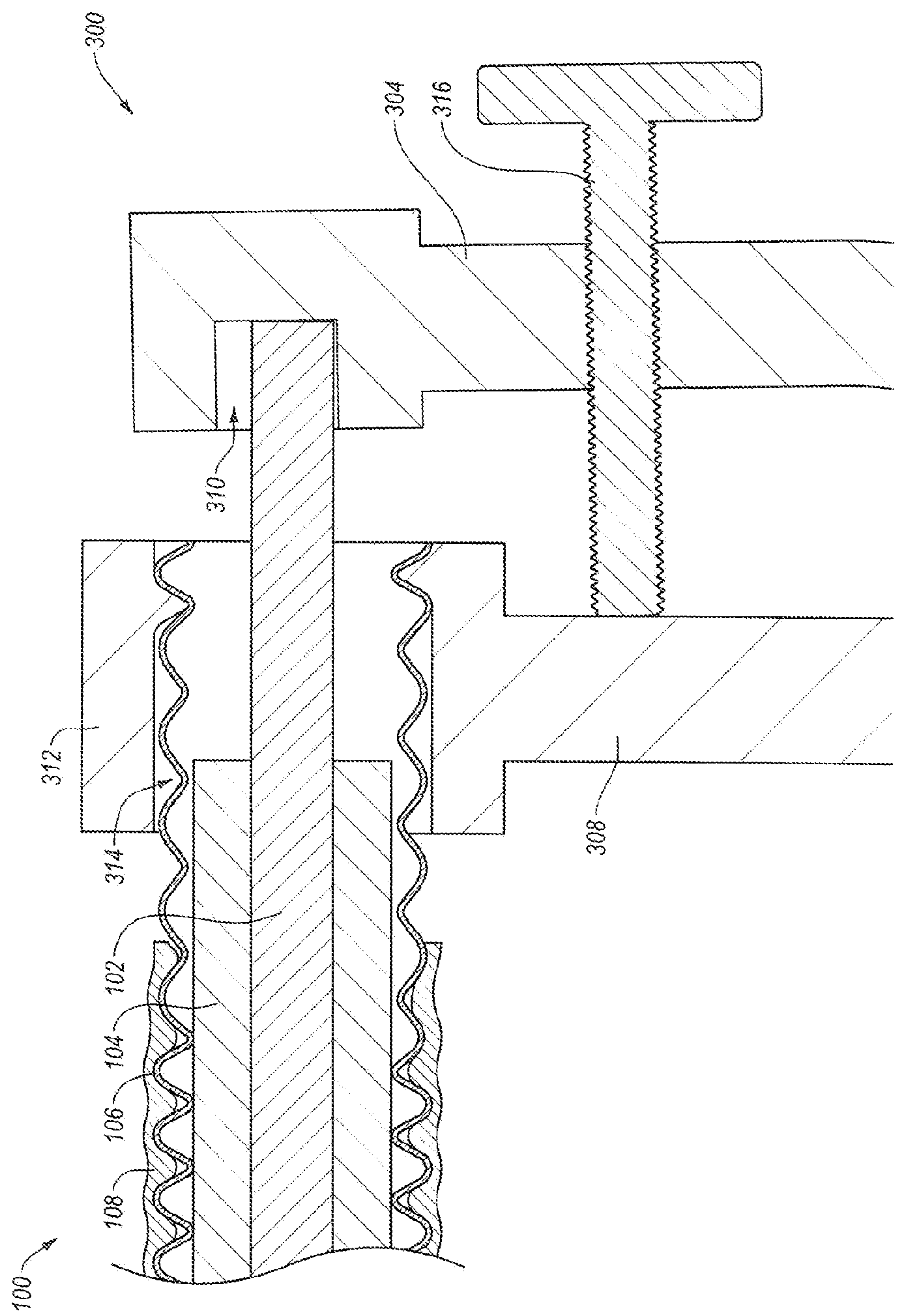
Figure 4E:
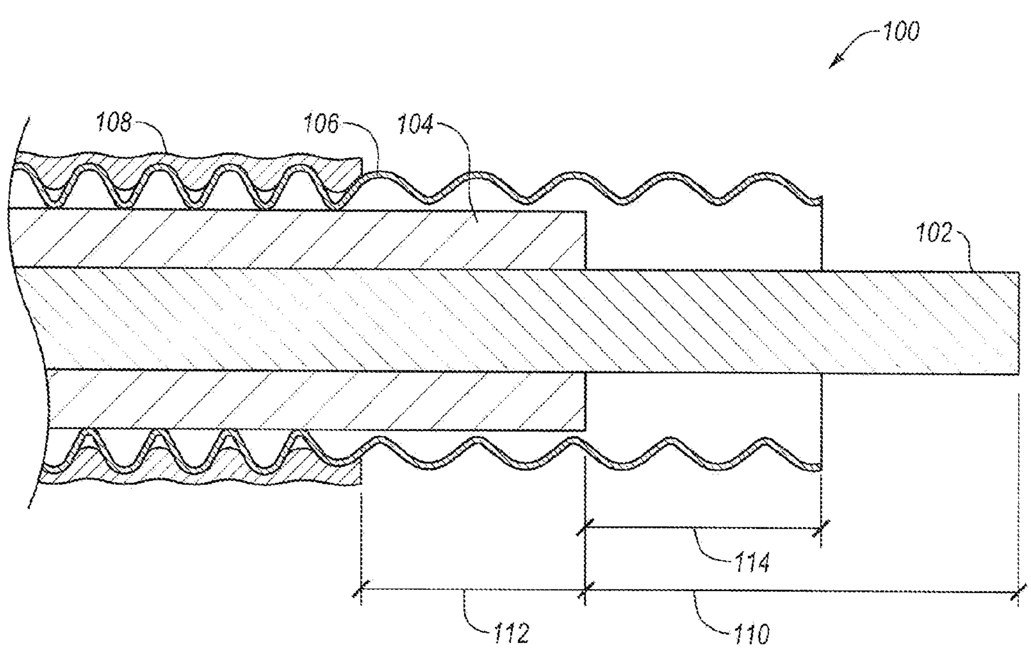

For example, as disclosed in FIG. 4C, the example tool 300 can engage the terminal end of the coaxial cable 100 by inserting the terminal end of the inner conductor 102 through the threaded opening 314 defined in the nut 312 and into the cavity 310 defined in the first jaw 304. Next, the threaded opening 314 can be screwed onto and engage the terminal end of the helical corrugated outer conductor 106. Then, as disclosed in the progression from FIG. 4C to FIG. 4D, as the first and second arms 302 and 306 are rotated toward each other, the first and second jaws 304 and 308 cooperate to axially stretch the terminal end of the helical corrugated outer conductor 106 beyond a terminal end of the insulating layer 104 and toward the terminal end of the inner conductor 102. As disclosed in FIG. 4E, this stretching results in the open section 114 of the corrugated coaxial cable 100 having an open space between the corrugated outer conductor 106 and the inner conductor 102. This stretching of the corrugated outer conductor 106 creates the open section 114 of the corrugated coaxial cable 100 without the use of a rotating coring tool, thus avoiding the risk of damage to the inner and outer conductors 102 and 106 associated with the use of rotating coring tools.

Figure 4F:
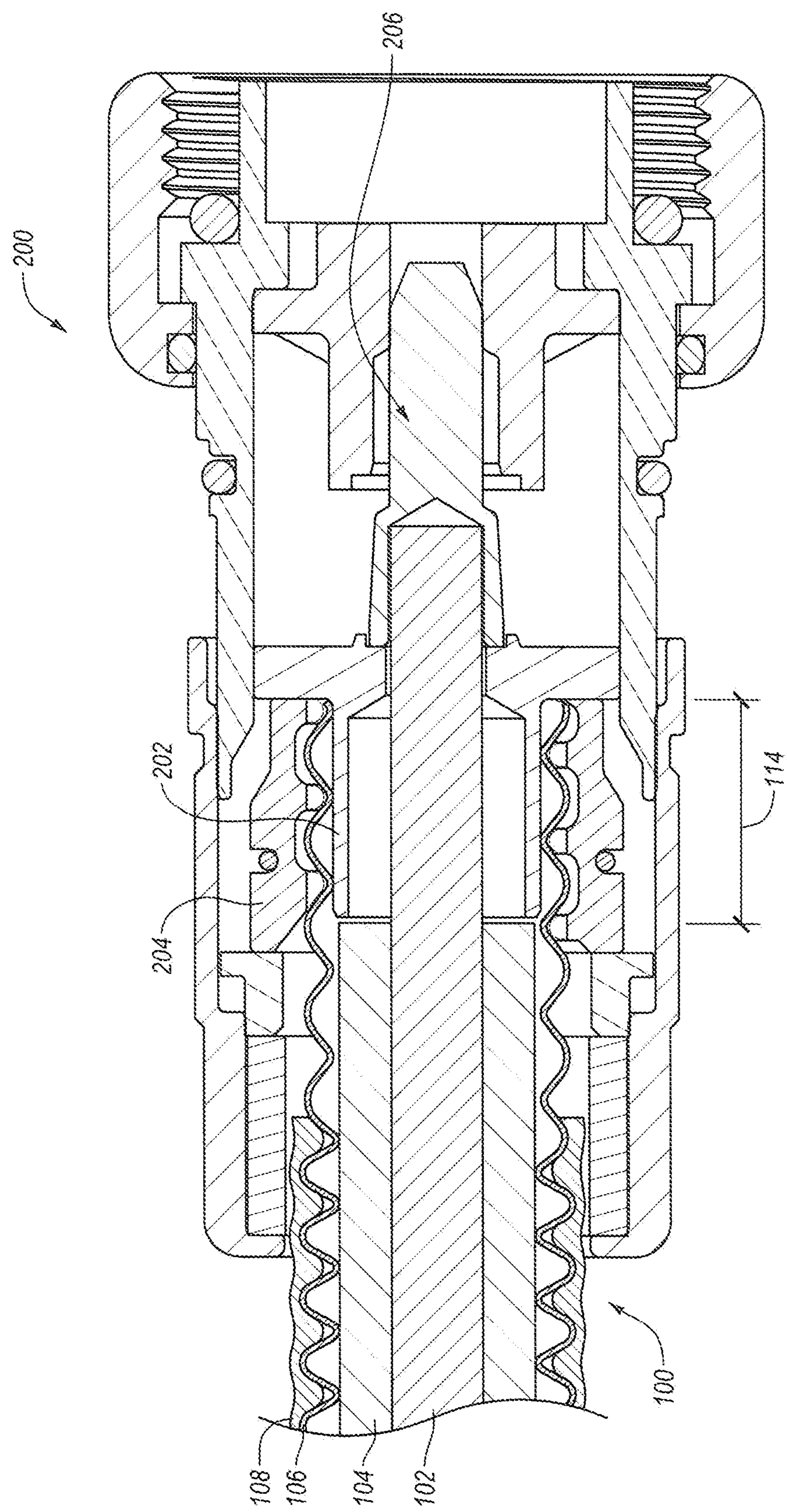

With reference to FIGS. 3 and 4F, the method 400 continues with an act 408 in which an internal connector structure 202 is inserted into the open section 114 between the corrugated outer conductor 106 and the inner conductor 102. The inserted portion of the internal connector structure 202 is configured as a mandrel that has an outside diameter that is slightly smaller than the smallest inside diameter of the open section 114 of the outer conductor 106. As disclosed in FIG. 4F, this slightly smaller outside diameter enables the open section 114 to be inserted into the connector 200 and slip over the internal connector structure 202.

Further, once inserted into the connector 200, the open section 114 is surrounded by an external connector structure 204. The external connector structure 204 is configured as a multi-piece clamp that can expand during insertion of the corrugated outer conductor 106 in order to slip over and then surround the corrugated outer conductor 106.

Also, once inserted into the connector 200, the inner conductor 102 of the coaxial cable 100 is received by a collet portion of a conductive pin 206 such that the conductive pin 206 is mechanically and electrically contacting the inner conductor 102.

Figure 4G:
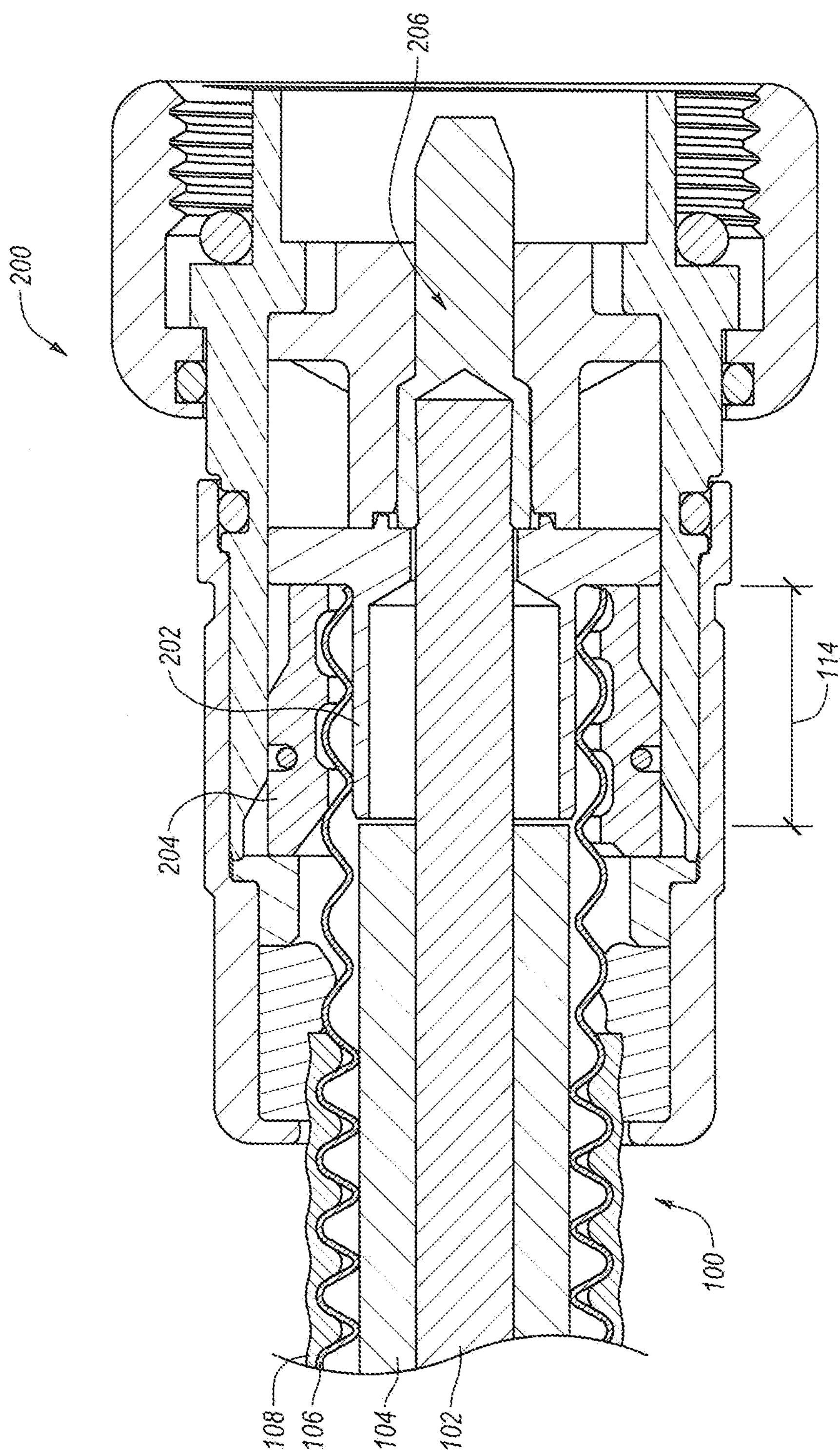

With reference to FIGS. 3 and 4G, the method 400 continues with an act 410 in which the external connector structure 204 is clamped around the outer conductor 106 and a simultaneous act 412 in which the contact force between the inner conductor 102 and the conductive pin 206 is increased. As disclosed in the progression from FIG. 4F to FIG. 4G, the acts 410 and 412 can be performed via a single action, such as the single action of moving the compression connector 200 from an open position (as disclosed in FIG. 4F) to an engaged position (as disclosed in FIG. 4G).

Additional details of the structure and function of the example connector 200, except that the external connector structure 204 is configured for use with a helical corrugated outer conductor instead of an annular corrugated outer conductor, are disclosed in co-pending U.S. patent application Ser. No. 12/889,990, titled "STRAIN RELIEF ACCESSORY FOR COAXIAL CABLE CONNECTOR," filed Sep. 24, 2010, which is incorporated herein by reference in its entirety.

VIII. Alternative Coaxial Cable Preparation Tools

It is understood that various alternative tools can be employed to axially stretch a terminal end of the corrugated outer conductor 106 beyond a terminal end of the insulating layer 104 of the coaxial cable 100.

For example, a first alternative tool can be configured similar to the example tool 300 except that the cavity 310 can be replaced with a protruding peg in order to stretch the outer conductor 106 when the terminal end of the inner conductor 102 begins flush with the terminal end of the outer conductor 106, or where the inner conductor 102 is less extended than shown in FIG. 4B.

Further, a second alternative tool can be configured similar to the example tool 300 or the first alternative tool except that the nut 312 is replaced with a device that is configured to clamp onto an annular corrugation instead of screwing onto a helical corrugation.

Also, a third alternative tool can be configured to stretch either a helical corrugated outer conductor or an annular corrugated outer conductor by employing a parallel action instead of a rotating action. For example, the third alternative tool can include a frame to which the corrugated outer conductor is temporarily fixed and a driving mechanism, such as a pin or bolt, that operates against the inner conductor along an axis that is parallel to the axis of the frame.

It is understood, therefore, that the example method 400, or any of the alternative methods discussed below, can be accomplished using various tools other than the tool 300.

IX. Alternative Methods for Terminating a Coaxial Cable

It is understood that two or more of the acts of the example method 400 discussed above can be performed via a single action or in reverse order. For example, a single stripping (not shown) can be employed to accomplish the acts 402 and 404 via a single action. Further, a combination stripping and stretching tool (not shown) can be employed to accomplish the acts 402, 404, and 406 via a single action. Also, the acts 402 and 404 can be performed in reverse order without materially affecting the results of the method 400.

It is further understood that various alternative methods can be employed to axially stretch a terminal end of the corrugated outer conductor 106 beyond a terminal end of the insulating layer 104 of the coaxial cable 100.

For example, in a first alternative method, a terminal end of the coaxial cable 100 can initially be cut so that all layers are flush. Next, a section of the jacket 108 can be stripped. Finally, the terminal end of the corrugated outer conductor 106 can be axially stretched beyond a terminal end of the insulating layer 104, resulting in an open section of the corrugated coaxial cable 100 in which the corrugated outer conductor 106 does not surround the insulating layer 104 and which the terminal end of the inner conductor 102 is recessed from the terminal end of the outer conductor 106.

Further, in a second alternative method, the first section 110 disclosed in FIG. 4A can be shortened so that after the performance of the method 400, the terminal end of the inner conductor 102 is recessed from, flush with, or extends past the terminal end of the outer conductor 106.

It is understood, therefore, that axially stretching a terminal end of a corrugated outer conductor beyond a terminal end of an insulating layer of a coaxial cable can be accomplished using various methods other than the method 400.

In addition, although the FIGS. 4D-4G generally show the stretched portion of the outer conductor 106 positioned outside the jacket 108, it is understood that the stretching of the outer conductor 106 can also stretch the outer conductor underneath the jacket 108. For example, in some example embodiments, the majority of the stretched portion of the outer conductor 106 can initially and/or ultimately reside underneath the jacket 108.

The example embodiments disclosed herein may be embodied in other specific forms. The example embodiments disclosed herein are to be considered in all respects only as illustrative and not restrictive.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A method for preparing a terminal end of a corrugated coaxial cable for termination, the corrugated coaxial cable comprising an inner conductor, an insulating layer surrounding the inner conductor, a corrugated outer conductor surrounding the insulating layer, the corrugated outer conductor having peaks and valleys, and a jacket surrounding the corrugated outer conductor, the method comprising:

stripping the jacket from a terminal section of the coaxial cable; and axially stretching a terminal end of the corrugated outer conductor beyond a terminal end of the insulating layer, comprising:

grasping an outside surface of the corrugated outer conductor and pulling the terminal end of the corrugated outer conductor beyond the terminal end of the insulating layer and beyond the terminal end of the inner conductor, and increasing the distance between two or more peaks in the corrugated outer conductor or increasing the distance between two or more valleys in the corrugated outer conductor, resulting in an open section of the corrugated coaxial cable in which the corrugated outer conductor does not surround the insulating layer.

2. The method as recited in claim 1, wherein the corrugated outer conductor comprises an annular corrugated outer conductor.

3. The method as recited in claim 1, wherein the corrugated outer conductor comprises a helical corrugated outer conductor.

* * * * *